United States Patent [19]

Miller

[11] Patent Number: 5,536,034
[45] Date of Patent: Jul. 16, 1996

[54] CONVERTIBLE BULK HAND TRUCK AND TABLE TOP

[76] Inventor: Walter A. Miller, 5687 Pleasant Ave., Northridgeville, Ohio 44039

[21] Appl. No.: 321,558

[22] Filed: Oct. 12, 1994

[51] Int. Cl.⁶ .............................. B62B 5/00; B62B 3/02
[52] U.S. Cl. .................... 280/651; 280/654; 280/655; 280/47.18; 280/47.28; 280/47.35; 280/47.371; 108/157
[58] Field of Search .................. 280/30, 43.1, 43.11, 280/47.2, 47.24, 47.27, 47.28, 47.11, 47.131, 47.18, 47.19, 47.35, 47.36, 47.371, 47.315, 47.34, 641, 651, 643, 645, 652, 654, 655.1, 79.11, 79.3; 108/44, 153, 157, 180, 189

[56] References Cited

U.S. PATENT DOCUMENTS

| | | | |
|---|---|---|---|
| 3,064,989 | 11/1962 | Bellows | 280/47.18 |
| 3,785,669 | 1/1974 | Doheny | 280/47.18 |
| 4,227,709 | 10/1980 | Gradwohl et al. | 280/47.11 |
| 4,284,286 | 8/1981 | Lewallen | 280/30 |
| 4,439,085 | 3/1984 | Rodriguez et al. | 280/47.29 |
| 4,565,382 | 1/1986 | Sherman | 280/47.18 |
| 4,921,270 | 5/1990 | Schoberg | 280/655.1 |
| 5,004,263 | 4/1991 | Hubbard | 280/645 |
| 5,160,182 | 11/1992 | Chang | 297/129 |
| 5,201,536 | 4/1993 | Bono et al. | 280/30 |

Primary Examiner—Richard M. Camby
Assistant Examiner—Frank Vanaman
Attorney, Agent, or Firm—Learman & McCulloch

[57] ABSTRACT

A convertible bulk hand truck with a lift off table is described which has a foldable linkage and structure that is adjustable between folded and unfolded positions to define either a two wheeled dolly device or a four wheeled platform cart with or without a table assembly and the foldable subframe has a table rest and the main frame has a toe plate or load support nose that is disposed vertically when the subframe is vertically positioned such that the subframe and toe plate are arranged to receive and support opposite ends of a lift off table assembly on the bulk hand truck for positioning a table top thereon in generally vertically spaced parallelism with the main frame of the convertible bulk hand truck when in its four wheeled platform cart position.

6 Claims, 5 Drawing Sheets

CONVERTIBLE BULK HAND TRUCK AND TABLE TOP

BACKGROUND OF THE INVENTION

1. Field of the Invention

The present invention relates to convertible bulk hand trucks that are adjustably positioned between folded and unfolded positions to define either a two wheeled dolly or a four wheeled platform and more particularly to such convertible bulk hand trucks having lift off top components in combination therewith.

2. Description of the Prior Art

Convertible bulk hand trucks having a main frame and a foldable subframe that are folded together for forming a two wheeled dolly device and that are positioned in an unfolded position to form a four wheeled cart are shown in U.S. Pat. Nos. 3,785,669 and 4,921,270. While suitable for their intended purpose, a problem with such trucks is that, in the four wheel cart position, the goods that are transported on the four wheel cart are located at floor level requiring bending and lifting movements as the goods are shifted from the cart in warehouses, shops, stores or from loading docks onto common carriers. While the load carrying capacity is dependent upon the number of articles such as crates, cartons, barrels or the like that can be positioned on the four wheel cart sometimes it is preferable to load and unload the goods from a more elevated position. Furthermore, in such applications it can be desirable to have a work and support surface located at table top level to carry out trimming or other operations as well as to facilitate loading and unloading of goods and products.

Other wheeled devices and table combinations are shown in U.S. Pat. Nos. 4,284,286; 4,565,382; 5,004,263; 5,160,182 and 5,201,536, none of which have the configuration or functional capability of serving as a two wheeled dolly and a four wheeled cart while also including features that serve to convert the four wheeled cart into a portable work table.

BRIEF DESCRIPTION OF THE INVENTION

An object and advantage of the present invention is to provide in combination a convertible bulk hand truck having a main frame and a foldable subframe adjustable between two wheel dolly operation and four wheel cart operation and a lift off table assembly that cooperates with the linkage of the convertible bulk hand truck to form a working surface at a table top level spaced vertically when the convertible truck is in its four wheel cart position.

A further object of the present invention is to provide a low cost, easily manufactured and assembled lift off table assembly for association with a convertible bulk hand truck having a main frame and a foldable subframe adjustable between two wheel dolly operation and four wheel cart operation.

Still another object is to provide a lift off table assembly for use with a convertible bulk hand truck having a two wheeled main frame and a foldable two wheeled subframe adjustable between two wheel dolly operation and four wheel cart operation wherein the lift off table unit includes a table top and a leg respectively supported on a table rest on the subframe and on the nose or toe plate on the mainframe when in their four wheel cart positions.

Yet another feature of the present invention is to provide a table assembly according to the preceding object wherein a table rest is supported on the subframe and the lift off table assembly has an edge releasably supported by the table rest when the convertible hand truck in its four wheel cart position.

Still another feature of the present invention is to provide a table assembly according to the preceding object wherein the leg has a lower end portion configured to receive a toe plate or load support nose that is disposed vertically when the subframe is vertically positioned and the main frame is horizontally positioned whereby the subframe and toe plate receive and support opposite ends of the lift off table assembly.

Yet another object of the present invention is to provide a table unit according to the preceding object wherein the table top and leg are connected by a hinge member and each have a hook thereon; one of the hooks being configured to be lifted onto and off a table rest supported on the subframe when it is in a vertically adjusted position and the other of the hooks being configured to be lifted onto and off the toe plate whereby the table top and leg are arranged generally perpendicularly for forming an elevated horizontal work surface and a vertical support for the table assembly.

Still another object is a method for providing a table top on a convertible hand truck assembly as set forth herein including the steps of: providing a table rest on the subframe at a location near the head end thereof either before or after the subframe is positioned vertically; providing a lift off table assembly having configured end edges; and mounting the lift off table assembly on the table rest and a vertically disposed toe plate of the four wheeled configured truck for providing a table top and support thereon. Alternatively the method can include the step of providing a table assembly having a leg configured to receive the toe plate on the hand truck whereby the table top can be lifted on and off the truck by placing the table leg lower end portion on the toe plate as a table top edge is received on the table rest.

These and other objects, advantages and features of the present invention will become more apparent from the following detailed description when taken together with the accompanying drawings wherein:

DETAILED DESCRIPTION OF A PREFERRED EMBODIMENT

Figure 1:
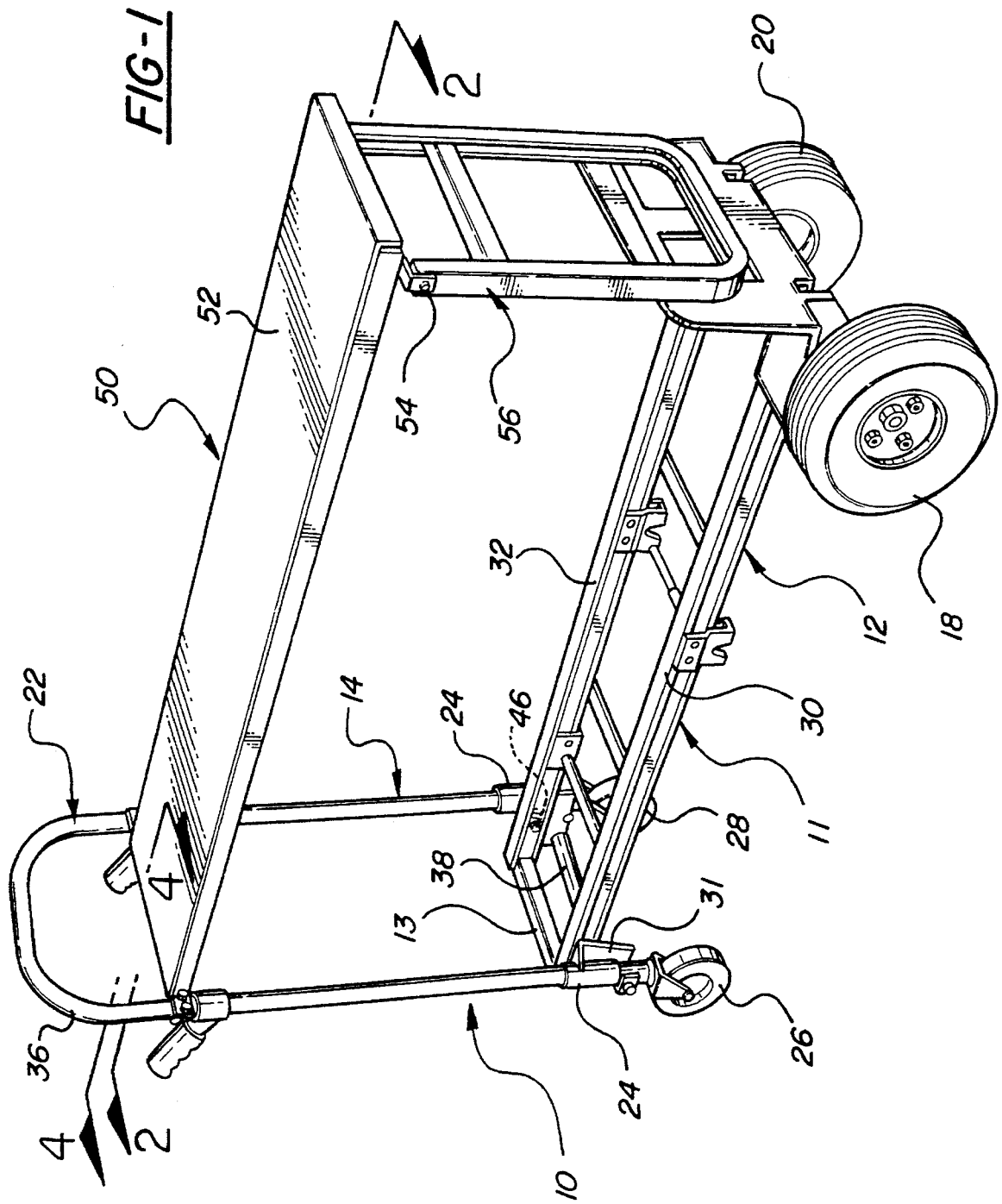
FIG. 1 is a perspective view of a convertible bulk hand truck including the present invention.

Referring now to the drawings, FIG. 1 illustrates a convertible bulk hand truck and table top assembly 10. It includes a convertible bulk hand truck 11 having an elongated main frame 12 and an elongated subframe 14 that is foldable with respect to the main frame 12. In the folded position, shown in FIG. 6, the main frame 12 and elongated subframe 14 form a two wheeled dolly that is positioned vertically. The main frame 12 includes a head end 13 and a base end 15 having an axle 16 connected thereto with two wheels 18, 20 for rolling the hand truck as a dolly.

Figure 2:
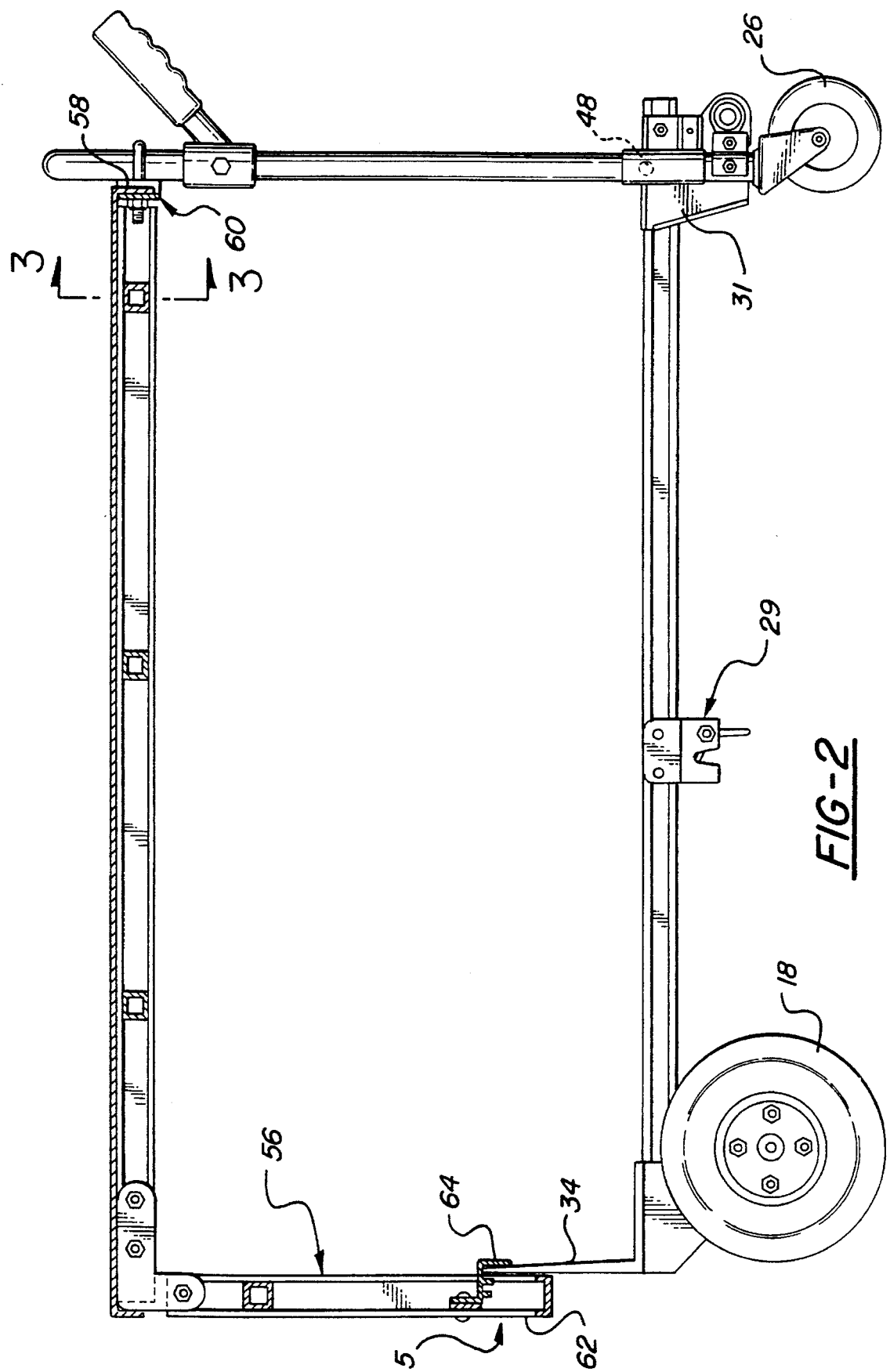
FIG. 2 is a sectional view taken along the line 2—2 of FIG. 1 looking in the direction of the arrows.
Figure 3:
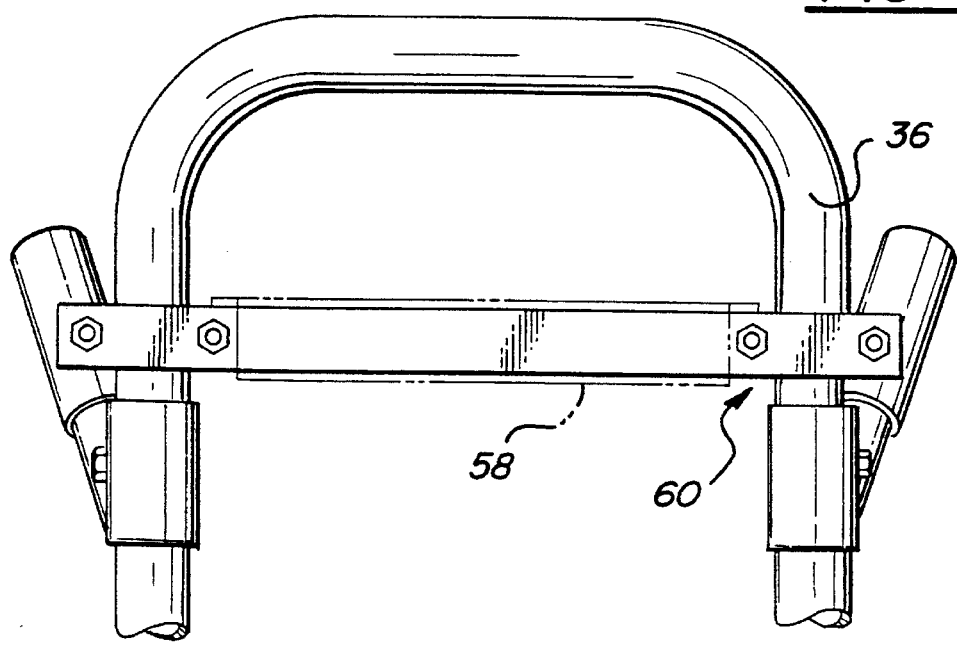
FIG. 3 is a fragmentary elevational view of a table rest looking in the direction of the arrows 3 in FIG. 2.
Figure 6:
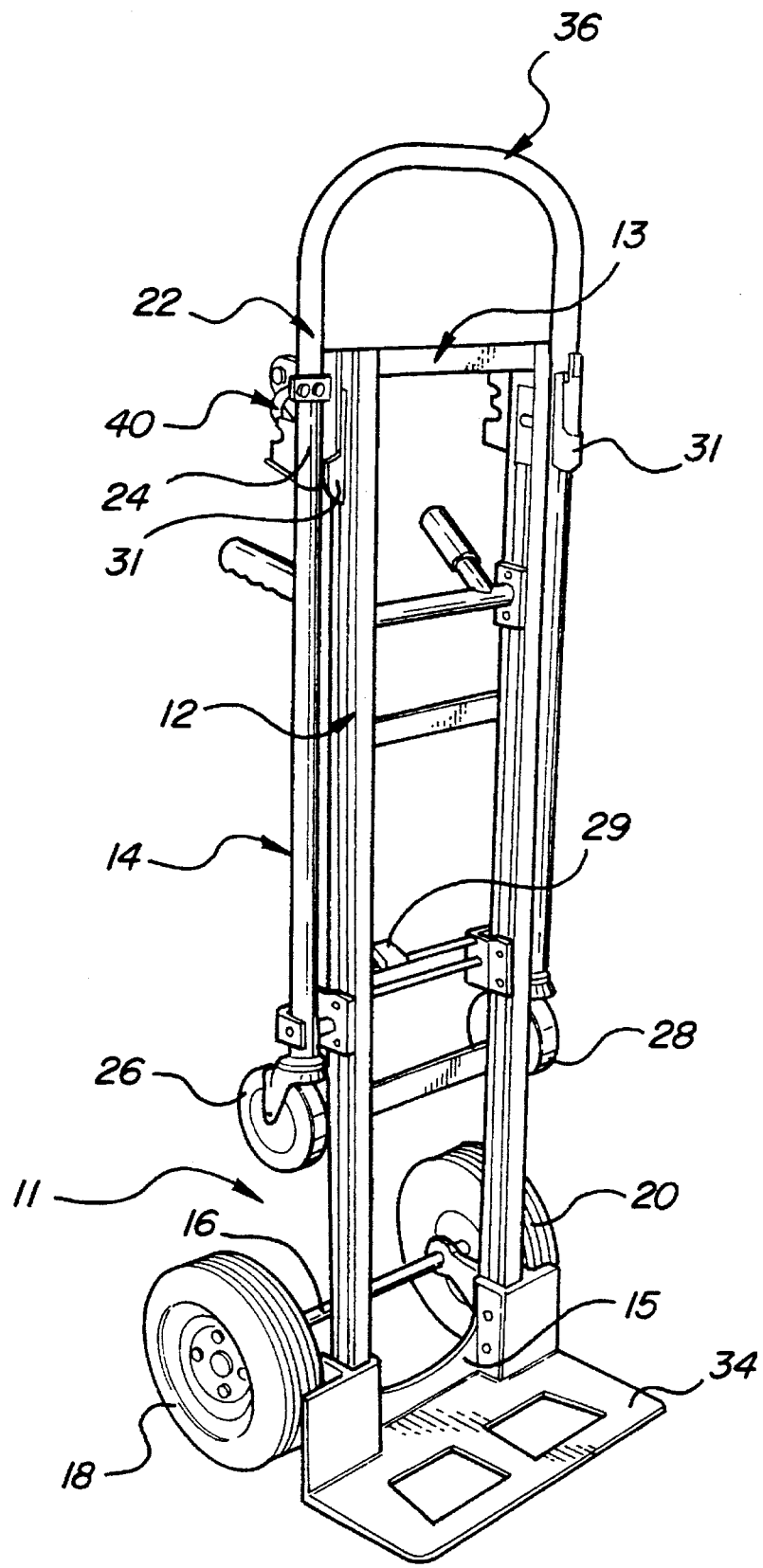
FIG. 6 is a perspective view of a convertible bulk hand truck in a two-wheeled dolly position.

The subframe 14 is pivotal with respect to the main frame 12 and has spaced arms on a handle 22 that will slide in sleeves 24 mounted on either side of the head end 13 of the main frame 12 to position a second pair of wheels 26, 28 on the end of the handle 22 so as to support the head end 13 of the frame on wheels while the opposite or base end 15 of the main frame 12 is supported on the two wheels 16, 18 for forming a four wheeled cart as shown in FIG. 1. A foot releasable spring actuated locking mechanism 29 is provided to secure the subframe 14 to the mainframe 12 when positioned as shown in FIG. 6. Additionally, a pair of platform lock plates 31 are provided to prevent rotation of the sleeves on pivot pins once the assembly 10 is in its four wheel cart position as shown in FIGS. 1 and 2. Details of the locking mechanism 29 and the platform lock plates 31 form no part of the present invention and are omitted from this description in order to avoid obfuscation of the present invention. A greater understanding of the locking mechanism and locking plates and their operation can be had by reference to the '669 patent at column 4, lines 36–68 and column 5, lines 10–21, respectively.

The main frame 12, more particularly, is elongated such that it will provide a suitable vertically oriented dolly assembly as shown in FIG. 6, including laterally spaced, laterally connected, longitudinally extending rails 30, 32 joined to the head end 13 and to the base end 15. A load support nose plate or toe plate 34 is supported by the base end 15 of the main frame 12 and is arranged to extend generally perpendicularly to the main frame 12.

The above-described subframe 14 has a head end 36 and a base end 38 in its two wheeled position shown in FIG. 6. The head end 36 is mounted on pivot linkage 40 including sleeves 24 connected to pivot pins 46, 48 on the head end 13 of the main frame 12 whereby the subframe 14 is mounted for pivotal movement with respect to the main frame.

The subframe head end 36 is joined to spaced, longitudinally extending legs forming the handle 22. The handle 22 is slidable in the sleeves 24 as the subframe 14 is pivoted on the main frame 12 so that the pair of sub wheels 26, 28 can be positioned in the four wheel cart positioned shown in FIGS. 1 and 2. Thus, mechanism is provided for slidably as well as pivotally mounting the subframe with the main frame to permit the main frame 12 to be shifted from a vertical position paralleling the subframe 14, when the latter is in a vertical folded position paralleling the main frame and the main frame 14 is in its two wheeled dolly or hand truck configuration, shown in FIG. 6. In this position, as can be seen, the nose plate projects generally horizontally such that it can be positioned under articles for moving them onto the dolly merely by tilting the nose plate or toe plate once in place under the load. The aforedescribed mechanism for slidably as well as pivotally mounting the subframe with the main frame permits it to be shifted from a vertical position paralleling the subframe, when the latter is in a vertical folded position paralleling the main frame and the main frame is in its two-wheel hand truck configuration, with the nose plate projecting generally horizontally, to a horizontal position perpendicular to the subframe 14 when the hand truck assumes the four wheeled platform configuration shown in FIGS. 1 and 2.

Figure 4:
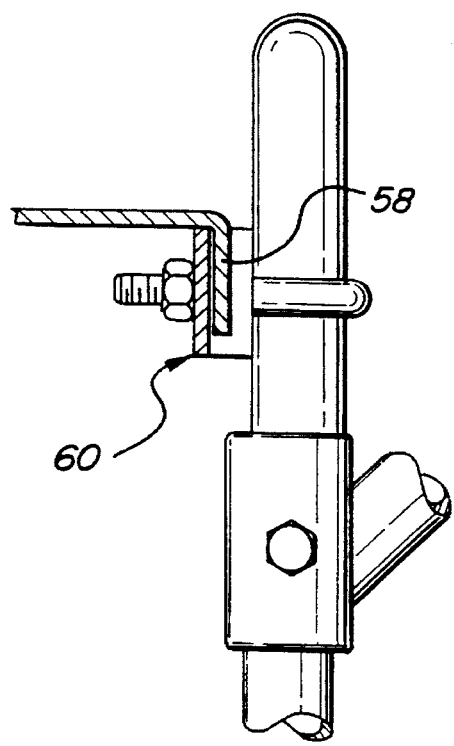
FIG. 4 is a fragmentary sectional view taken along the line 4—4 of FIG. 1 looking in the direction of the arrows.

In the illustrated arrangement, a table assembly 50 is provided that is adapted to be included in combination with the assembly 10 when in its four wheeled cart position as shown in FIGS. 1 and 2. The table assembly 50 includes a table top 52 connected by a hinge member 54 to a support leg 56. As shown in FIG. 4, the table top has an edge extending laterally thereof that forms a downwardly facing hook 58. The hook 58 is configured to be lifted onto and off a table rest support 60 extending laterally across the subframe 14 at a point raised above the main frame 12 when the assembly 10 is in its four wheel cart position.

Figure 5:
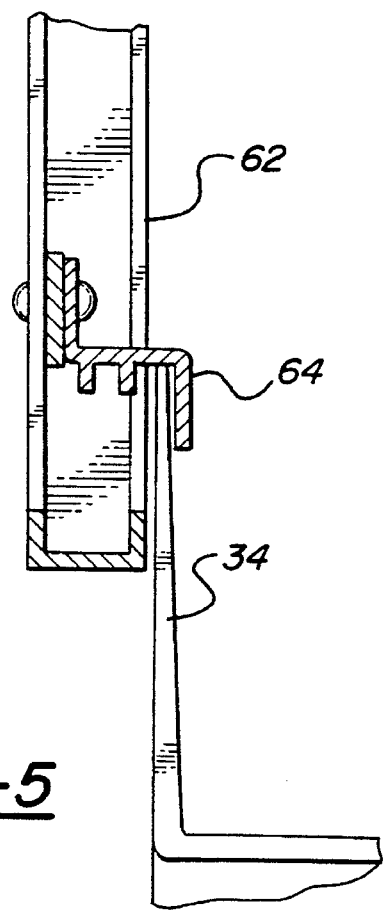
FIG. 5 is an enlarged fragmentary sectional view in FIG. 2 identified by the arrow 5.

The support leg 56 for the table top 52 has a lower end portion 62 thereof connected to a hook 64 that in turn is configured to receive the nose or toe plate 34 when the convertible hand truck assembly 10 is in its four-wheeled configuration in which the nose plate 34 extends substantially vertically upwardly from the horizontally disposed main frame 12 as best shown in FIG. 5.

Specifically, a table top is provided for use with a convertible hand truck as defined above and which includes the table rest 60 on the subframe 14 at a location near the head end 36 thereof and that further includes a vertically disposed nose or toe plate 34. The table top is a lift off table assembly 50 that preferably is foldable but to reduce cost can be formed without the hinge member such that an edge 58 on the lift off table top can be releasably supported by the table rest 60 when the convertible hand truck is in its four-wheeled configuration (See FIG. 1). The lift off table 50 further includes the leg segment 56 having the lower end portion 62 provided with a hook 64 configured to receive the nose or toe plate 34 and to be releasably supported thereon. While hooks 58, 64 are suitable for accomplishing the objectives of a quick lift off and assembly method to be described, it will be recognized by those skilled in the art that other forms of releasable connection are also within the scope of the invention such as spaced bent tabs rather than a continuous flange that forms the hooks. Alternatively, the hook or tabs can be formed on the table rest or the underside of the toe plate such that the ends of the perpendicularly arranged parts of the lift off table assembly are supported in interlocking hooks/tabs rather than the reverse.

In each case the table top 52 and leg 56 are arranged perpendicularly to one and other such that they are configured to be lifted onto and off the table rest and toe plate and interlocked therewith whereby the lift off table top is arranged generally with its leg disposed perpendicularly and vertically of the main frame 12 and with its top surface spaced above and parallel to the main frame 12 for forming a work surface and a vertical support on the convertible bulk hand truck and table top 10.

Figure 7:
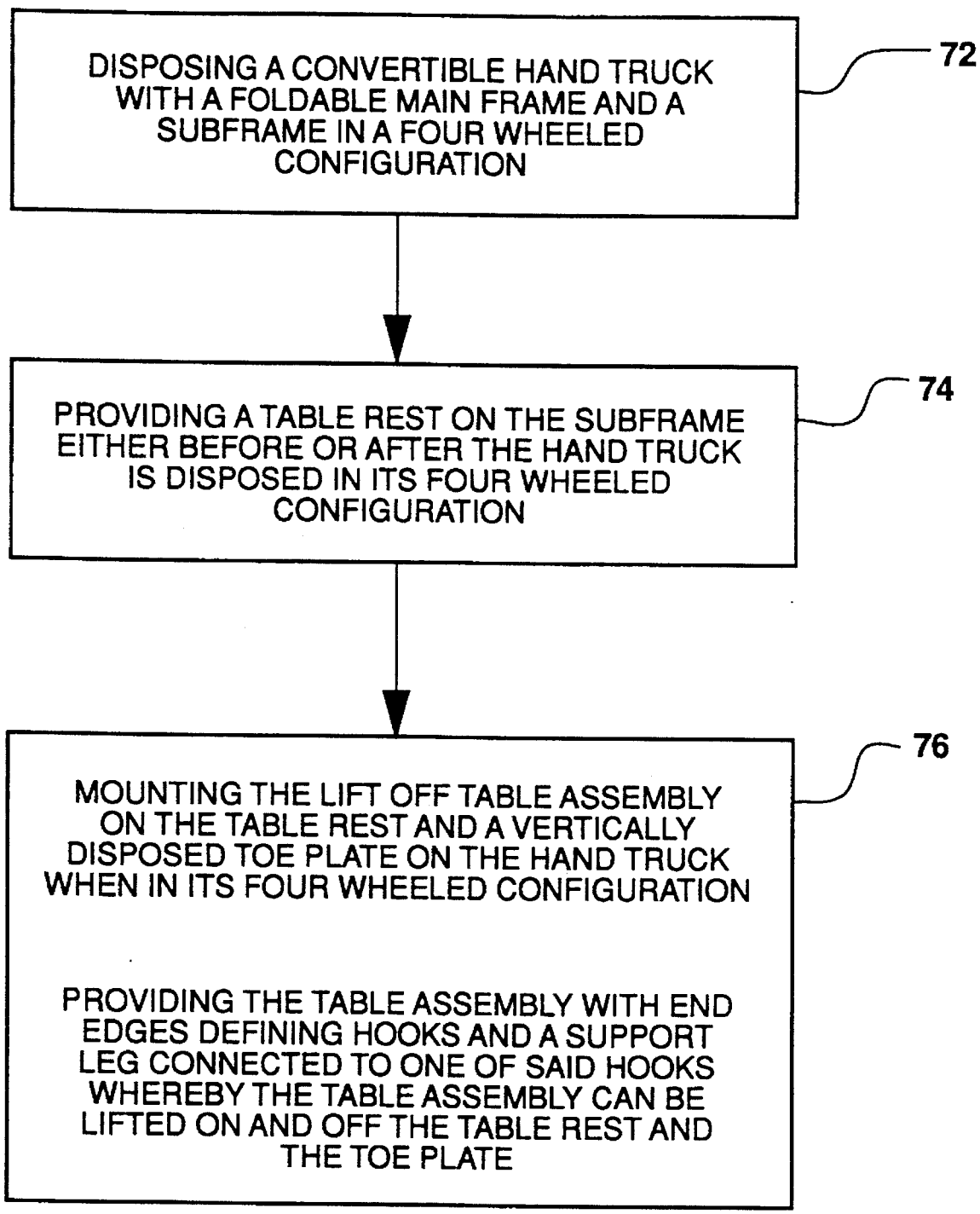
FIG. 7 is a flow chart of the method of the present invention.

The method of the present invention includes a method of assembling a table and convertible hand assembly as setforth in the flow chart of FIG. 7. The method applies to a hand truck that is capable of being moved from a folded position in which it has the configuration of a two wheeled hand truck to an unfolded position in which it has the configuration of a four wheeled platform cart, the convertible hand truck including an elongated main frame with laterally, spaced, laterally connected, longitudinally extending side rails, the main frame having a head end and a base end, an axle mounted by the base end of the main frame having primary frame supporting wheels thereon, a load support nose plate supported by the base end of the frame to extend generally perpendicularly to the main frame, an elongated subframe having a head and base end with secondary wheels on its base end, and mechanism for slidably as well as pivotally connecting the subframe with said main frame to permit said main frame to be shifted from a vertical position paralleling said subframe, when the latter is in vertical folded position adjacent the main frame and the main frame is in two wheeled hand truck configuration, with the nose plate projecting generally horizontally, to a horizontal position perpendicular to the subframe when the hand truck assumes four wheeled platform configuration in which the main frame is generally horizontal, the nose plate projects upwardly therefrom and the primary and secondary wheels are both in ground-engaging positions the following steps.

The method includes the step of disposing a convertible hand truck with a foldable main frame and a subframe in a four wheeled configuration at block 72. Providing a table rest on the subframe at a location near the head end thereof as provided at block 74. It should be understood that this step can be performed either before or after the step provided by block 76 providing a lift off table assembly having configured ends. Thereafter, mounting the lift off table assembly on the table rest and a vertically disposed toe plate of the four wheeled configured truck as provided at block 76. Alternatively, the method can include the step of providing a table assembly having a leg configured to receive the toe plate on the hand truck whereby the table top can be lifted on and off the truck by placing the table leg lower end portion on the toe plate as the table top edge is received on the table rest.

What is claimed is:

1. The combination with a convertible hand truck capable of being moved from a folded position in which it has the configuration of a two-wheeled hand truck to an unfolded position in which it has the configuration of a four wheeled platform cart, the convertible hand truck including an elongated main frame with laterally spaced, laterally connected, longitudinally extending side rails, the main frame have a head end and a base end, an axle mounted by the base end of the main frame having primary frame supporting wheels thereon, a load support nose plate supported by the base end of the frame to extend generally perpendicularly to the main frame, an elongated subframe having a head and base end with secondary wheels on its base end, and mechanism for slidably as well as pivotally mounting the subframe to said main frame to permit said main frame to be shifted from a vertical position paralleling said subframe, when the latter is in vertical folded position paralleling said main frame and the main frame is in two-wheeled hand truck configuration, with the nose plate projecting generally horizontally, to a horizontal position perpendicular to said subframe when the hand truck assumes four wheeled platform truck configuration in which the main frame is generally horizontal, the nose plate projects upwardly therefrom, and the primary and secondary wheels are both in ground engaging positions, of:

a) a table rest supported on the subframe at a location near the head end thereof; and b) a lift off table top having a first downwardly facing hook releasably supported by said table rest when the convertible hand truck is in four-wheeled configuration, and c) a support leg on said lift off table top; said support leg having a lower end portion defining a second downwardly facing hook and configured to receive said nose plate and to be releasably supported thereon when said convertible hand truck is in four wheeled configuration and said nose plate extends upwardly from said horizontal main frame.

2. For use with a convertible hand truck capable of being moved from a folded position in which it has the configuration of a two-wheeled hand truck to an unfolded position in which it has the configuration of a four wheeled platform cart, the convertible hand truck including an elongated main frame with laterally spaced, laterally connected, longitudinally directed side rails, the main frame having a head end and a base end, an axle mounted by the base end of the main frame having primary frame supporting wheels thereon, a load support nose plate supported by the base end of the frame to extend generally perpendicularly to the main frame, an elongated subframe having a head and base end with secondary wheels on its base end, and mechanism for slidably as well as pivotally mounting the subframe to said main frame to permit said main frame to be shifted from a vertical position paralleling said subframe, when the latter is in vertical folded position paralleling said main frame and the main frame is in two-wheeled hand truck configuration, with the nose plate projecting generally horizontally, to a horizontal position perpendicular to said subframe when the hand truck assumes four wheeled platform truck configuration in which the main frame is generally horizontal, the nose plate projects upwardly therefrom, and the primary and secondary wheels are both in ground-engaging positions; a table assembly comprising:

a) a table rest supported on the subframe at a location near the head end thereof; and b) a lift off table top having a first downwardly facing hook releasably supported by said table rest when the convertible hand truck is in four-wheeled configuration, and;

c) a leg on said lift off table top; said leg having a lower end portion defining a second downwardly facing hook configured to receive said nose plate and to be releasably supported thereon when said convertible hand truck is in four-wheeled configuration and said nose plate extends upwardly from said horizontal main frame.

3. A method of assembling a table and convertible hand truck assembly, the hand truck being capable of being moved from a folded position in which it has the configuration of a two-wheeled hand truck to an unfolded position in which it has the configuration of a four wheeled platform cart, the convertible hand truck including an elongated main frame with laterally spaced, laterally connected, longitudinally extending side rails, the main frame having a head end and a base end, an axle mounted by the base end of the main frame having primary frame supporting wheels thereon, a load support nose plate supported by the base end of the frame to extend generally perpendicularly to the main frame, an elongated subframe having a head and base end with secondary wheels on its base end, and mechanism for slidably as well as pivotally mounting the subframe to said main frame to permit said main frame to be shifted from a vertical position paralleling said subframe, when the latter is in vertical folded position adjacent said main frame and the main frame is in two-wheeled hand truck configuration, with the nose plate projecting generally horizontally, to a horizontal position perpendicular to said subframe when the hand truck assumes four wheeled platform truck configuration in which the main frame is generally horizontal, the nose plate projects upwardly therefrom, and the primary and secondary wheels are both in ground-engaging positions; the steps of:

a) disposing said convertible hand truck in the four-wheeled configuration;

b) providing a table edge rest on the subframe at a location near the head end thereof; and c) mounting a lift off table assembly to the four-wheeled configuration of said convertible hand truck by providing end edges on the lift off table assembly configured to respectively receive said nose plate on said convertible hand truck and to receive said table edge rest.

4. The method of claim 3 further comprising providing the table edge rest prior to folding the main frame and subframe to a four wheel configuration.

5. The method of claim 3 further comprising providing a table top assembly having a support leg and having end edges configured as hooks.

6. The method of claim 5 further comprising providing the table rest prior to folding the main frame and subframe to a four wheel configuration.

* * * * *